US012217186B2

(12) United States Patent
Balazevic et al.

(10) Patent No.: US 12,217,186 B2
(45) Date of Patent: Feb. 4, 2025

(54) METHOD AND APPARATUS FOR SEMI-SUPERVISED LEARNING

(71) Applicant: SAMSUNG ELECTRONICS CO., LTD., Suwon-si (KR)

(72) Inventors: Ivana Balazevic, Staines (GB); Carl Allen, Staines (GB); Timothy Hospedales, Staines (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 485 days.

(21) Appl. No.: 17/436,927

(22) PCT Filed: May 25, 2021

(86) PCT No.: PCT/KR2021/006497
§ 371 (c)(1),
(2) Date: Sep. 7, 2021

(87) PCT Pub. No.: WO2021/241983
PCT Pub. Date: Dec. 2, 2021

(65) Prior Publication Data
US 2023/0177344 A1 Jun. 8, 2023

(30) Foreign Application Priority Data

May 28, 2020 (GB) ..................................... 2008030
Dec. 18, 2020 (EP) ..................................... 20215401

(51) Int. Cl.
*G06N 3/088* (2023.01)
*G06N 3/084* (2023.01)
(Continued)

(52) U.S. Cl.
CPC ............. *G06N 3/084* (2013.01); *G06N 3/088* (2013.01); *G06V 10/764* (2022.01);
(Continued)

(58) Field of Classification Search
CPC .... G06V 10/7784; G06V 10/82; G06V 10/80; G06V 10/803; G06V 10/811;
(Continued)

(56) References Cited

U.S. PATENT DOCUMENTS

2007/0005341 A1 1/2007 Burges et al.
2008/0071708 A1 3/2008 Dara et al.
(Continued)

FOREIGN PATENT DOCUMENTS

KR 10-2017-0083419 A 7/2017
KR 10-2033136 B1 10/2019

OTHER PUBLICATIONS

@misc{izmailov2019semisupervised, title={Semi-Supervised Learning with Normalizing Flows}, author={Pavel Izmailov and Polina Kirichenko and Marc Finzi and Andrew Gordon Wilson}, year={2019}, (Year: 2019).*
(Continued)

*Primary Examiner* — Edward F Urban
*Assistant Examiner* — Duy Tran
(74) *Attorney, Agent, or Firm* — Sughrue Mion, PLLC

(57) ABSTRACT

Provided is a computer-implemented method for training a machine learning (ML) model using labelled and unlabelled data, the method comprising obtaining a set or training data comprising a set of labelled data items and a set of unlabelled data items, training a loss module of the ML model using labels in the set of labelled data items, to generate a trained loss module capable of estimating a likelihood of a label for a data item, and training a task module of the ML model using the loss module, the set of labelled data items, and the set of unlabelled data items, to generate a trained task module capable of making a prediction of a label for input data.

14 Claims, 7 Drawing Sheets

(51) Int. Cl.
*G06V 10/764* (2022.01)
*G06V 10/774* (2022.01)
*G06V 10/778* (2022.01)
*G06V 10/82* (2022.01)

(52) U.S. Cl.
CPC ...... *G06V 10/7753* (2022.01); *G06V 10/7784* (2022.01); *G06V 10/82* (2022.01)

(58) Field of Classification Search
CPC .. G06V 10/764; G06V 10/70; G06V 10/7753; G06N 3/084; G06N 3/088; G06N 3/0895; G06N 3/08; G06N 3/09; G06N 20/00
See application file for complete search history.

(56) References Cited

U.S. PATENT DOCUMENTS

| | | | |
|---|---|---|---|
| 2012/0263376 A1* | 10/2012 | Wang | G06V 10/774 382/160 |
| 2013/0097103 A1 | 4/2013 | Chari et al. | |
| 2015/0170055 A1 | 6/2015 | Beymer et al. | |
| 2018/0101768 A1 | 4/2018 | Laine et al. | |
| 2018/0285771 A1* | 10/2018 | Lee | G06N 20/00 |
| 2019/0114544 A1* | 4/2019 | Sundaram | G06F 18/24133 |
| 2019/0147320 A1* | 5/2019 | Mattyus | G06V 20/182 382/155 |
| 2019/0205733 A1 | 7/2019 | Ghaeini et al. | |
| 2020/0057936 A1* | 2/2020 | Haeusser | G06N 3/08 |
| 2021/0192719 A1* | 6/2021 | Laaksonen | G06N 3/045 |

OTHER PUBLICATIONS

Izmailov P, Kirichenko P, Finzi M, Wilson AG. Semi-Supervised Learning with Normalizing Flows. arXiv preprint arXiv:1912.13025. Dec. 30, 2019. (Year: 2019).*

Chen L, Yu S, Yang M. Semi-supervised convolutional neural networks with label propagation for image classification. In2018 24th International Conference on Pattern Recognition (ICPR) Aug. 20, 2018 (pp. 1319-1324). IEEE. (Year: 2018).*

International Search Report and Written Opinion dated Sep. 1, 2021, issued by the International Searching Authority in International Application No. PCT/KR2021/006497 (PCT/ISA/220, 210, 237).

Pavel Izmailov et al., "Semi-Supervised Learning with Normalizing Flows", arXiv:1912.13025v1 [cs.LG], arxiv.org, Dec. 30, 2019, 15 pages total, XP081568078.

David Berthelot et al., "Remixmatch: Semi-Supervised Learning With Distribution Alignment and Augmentation Anchoring", arXiv:1911. 09785v2 [cs.LG], arxiv.org, Nov. 22, 2019, 13 pages total, XP081599359.

Communication dated Jun. 18, 2021 issued by the European Patent Office in European Application No. 20215401.9.

Grandvalet, Yves et al., "Semi-supervised Learning by Entropy Minimization", NIPS, 2004. (8 pages total).

Sajjadi, Mehdi et al., "Mutual Exclusivity Loss for Semi-Supervised Deep Learning", ICPR, 2016, pp. 1908-1912. (5 pages total).

Tarvainen, Antti et al., "Mean Teachers Are Better Role Models: Weight-averaged Consistency Targets Improve Semi-supervised Deep Learning Results", 31st Conference on Neural Information Processing Systems, NIPS 2017. (10 pages total).

Laine, Samuli et al., "Temporal Ensembling for Semi-Supervised Learning", Published as a conference paper at ICLR 2017, arXiv:1610. 02242v3, [cs.NE], Mar. 15, 20217. (13 pages total).

Durkan, Conor et al., "Neural Spline Flows", 33rd Conference on Neural Information Processing Systems (NeurIPS 2019), arXiv:1906. 04032v2 [stat.ML], Dec. 2, 2019. (18 pages total).

Balazevic, Ivana et al., "Learning the Prediction Distribution for Semi-Supervised Learning with Normalising Flows", arXiv:2007. 02745v1 [cs.LG], Jul. 6, 2020. (11 pages total).

Allen Carl et al., "A Probabilistic Model for Discriminative and Neuro-Symbolic Semi-Supervised Learning", arXiv:2006.05896v4 [cs.LG], May 3, 2021. (11 pages total).

* cited by examiner

[Fig. 1]
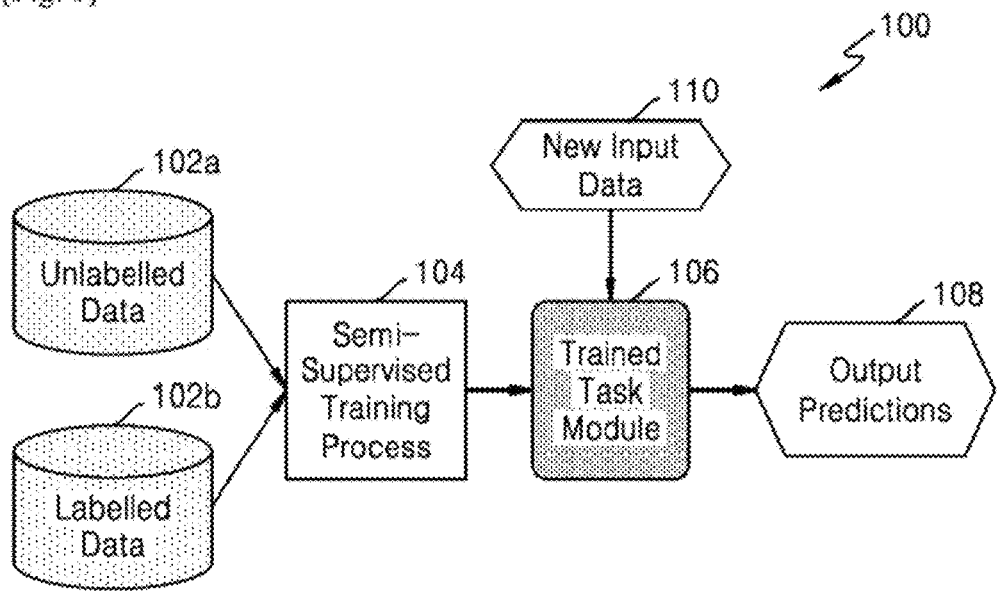
[Fig. 2]
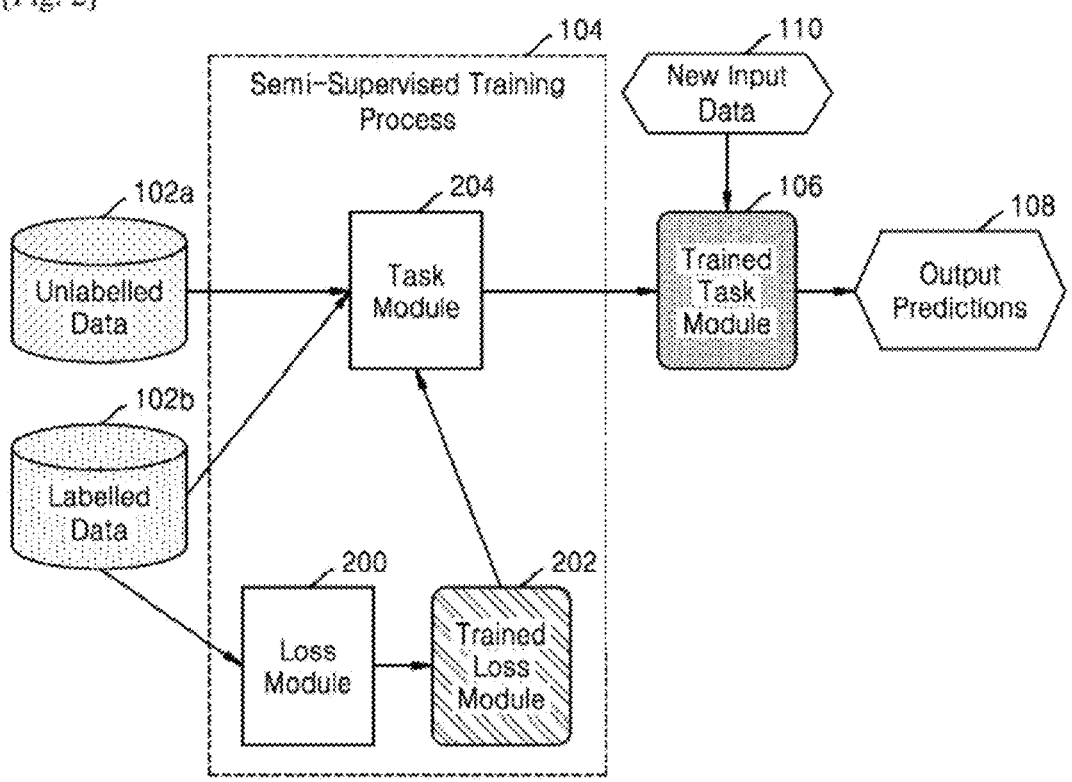

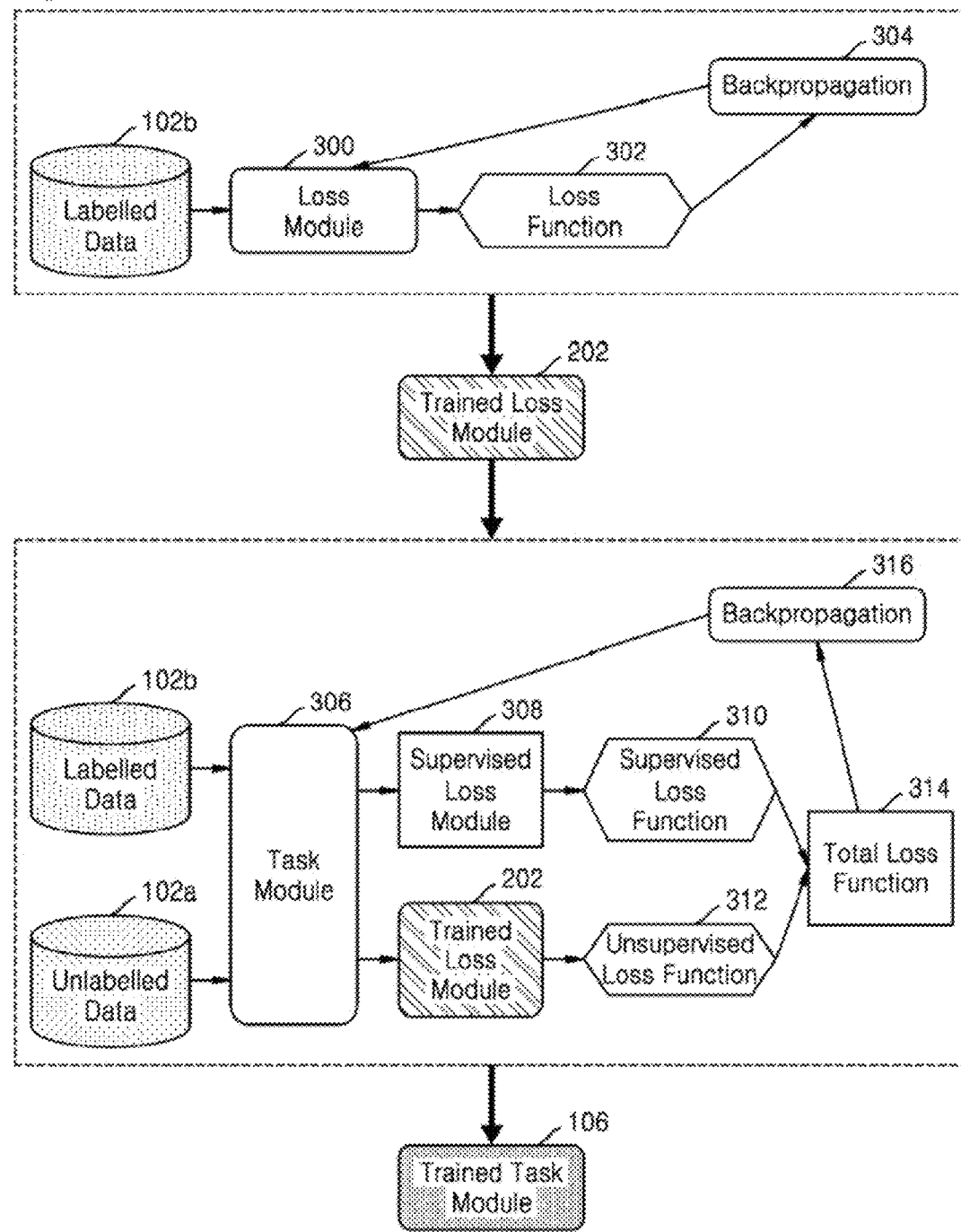
[Fig. 3]

[Fig. 4]
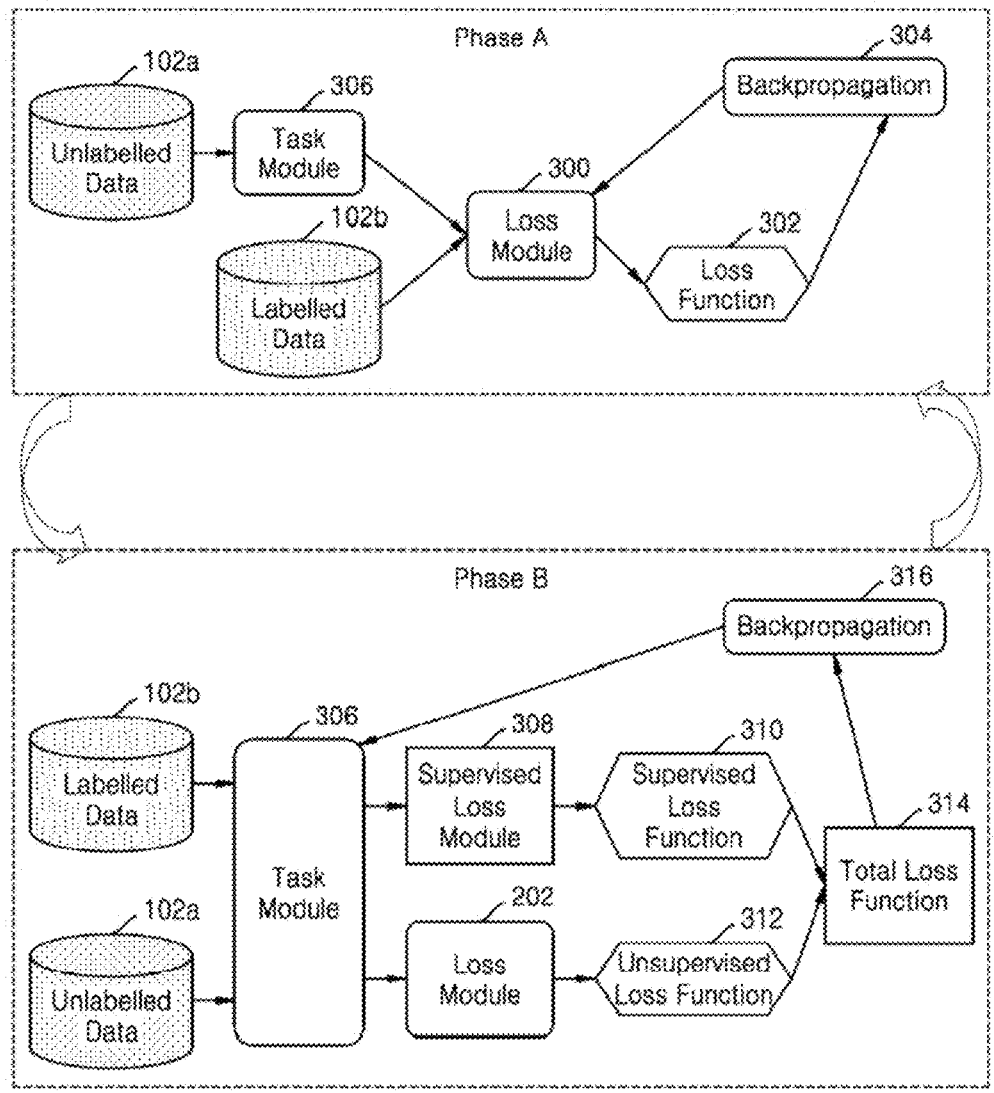
[Fig. 5A]
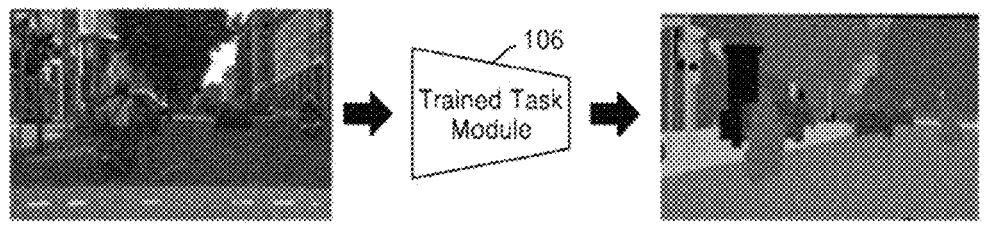
[Fig. 5B]
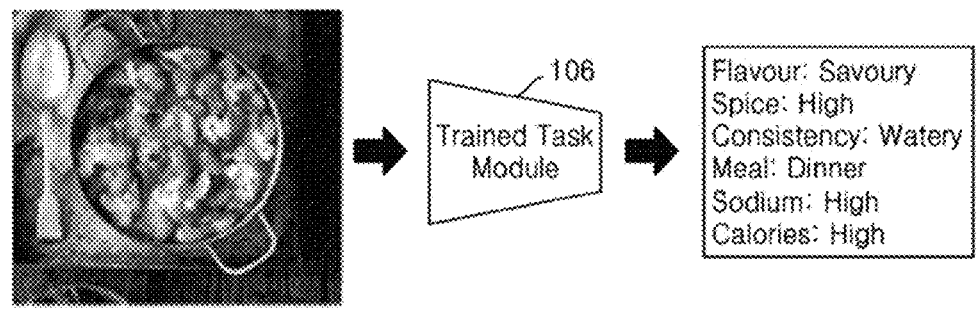

[Fig. 5C]
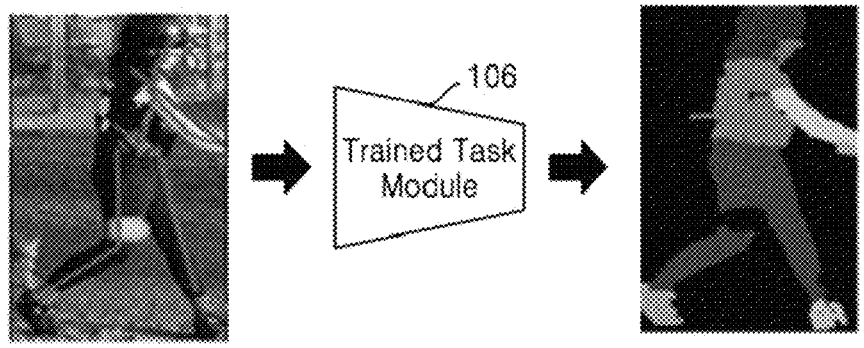
[Fig. 6]
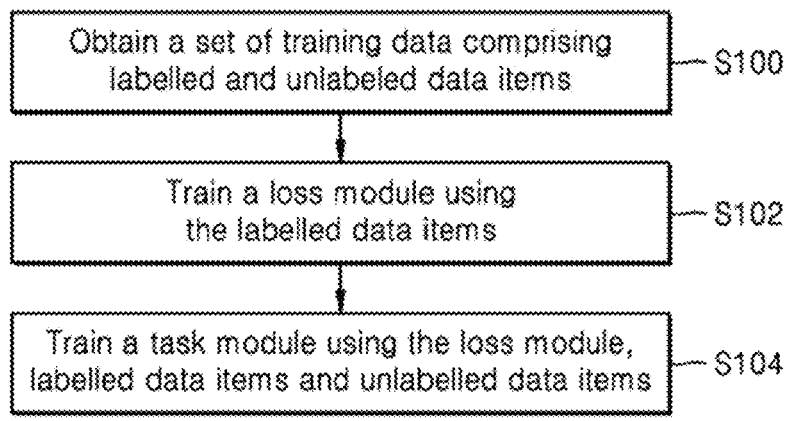
[Fig. 7A]
First Technique – Training Loss Module
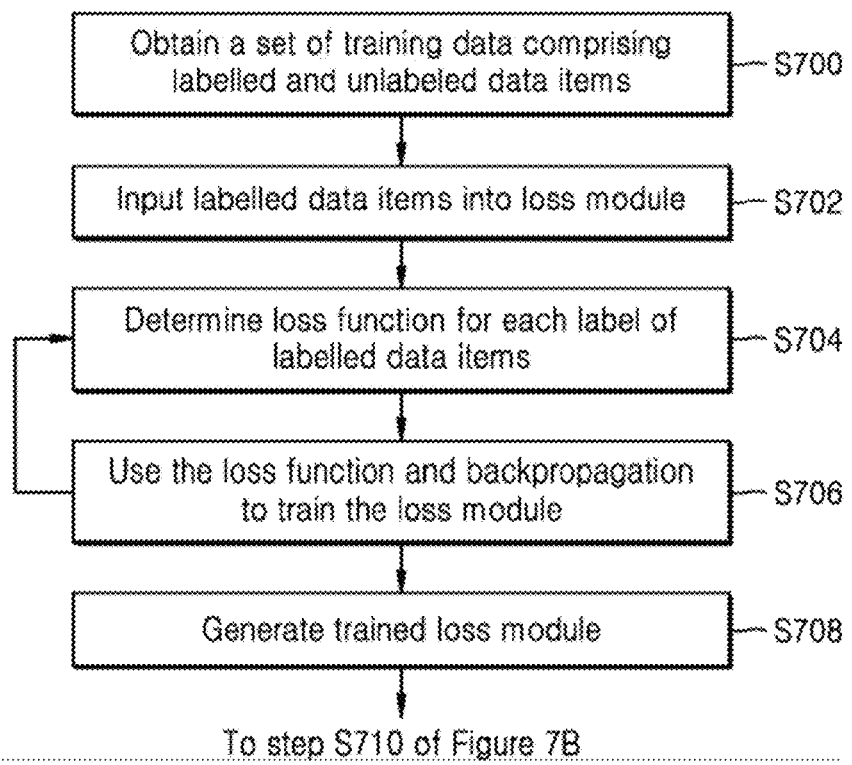

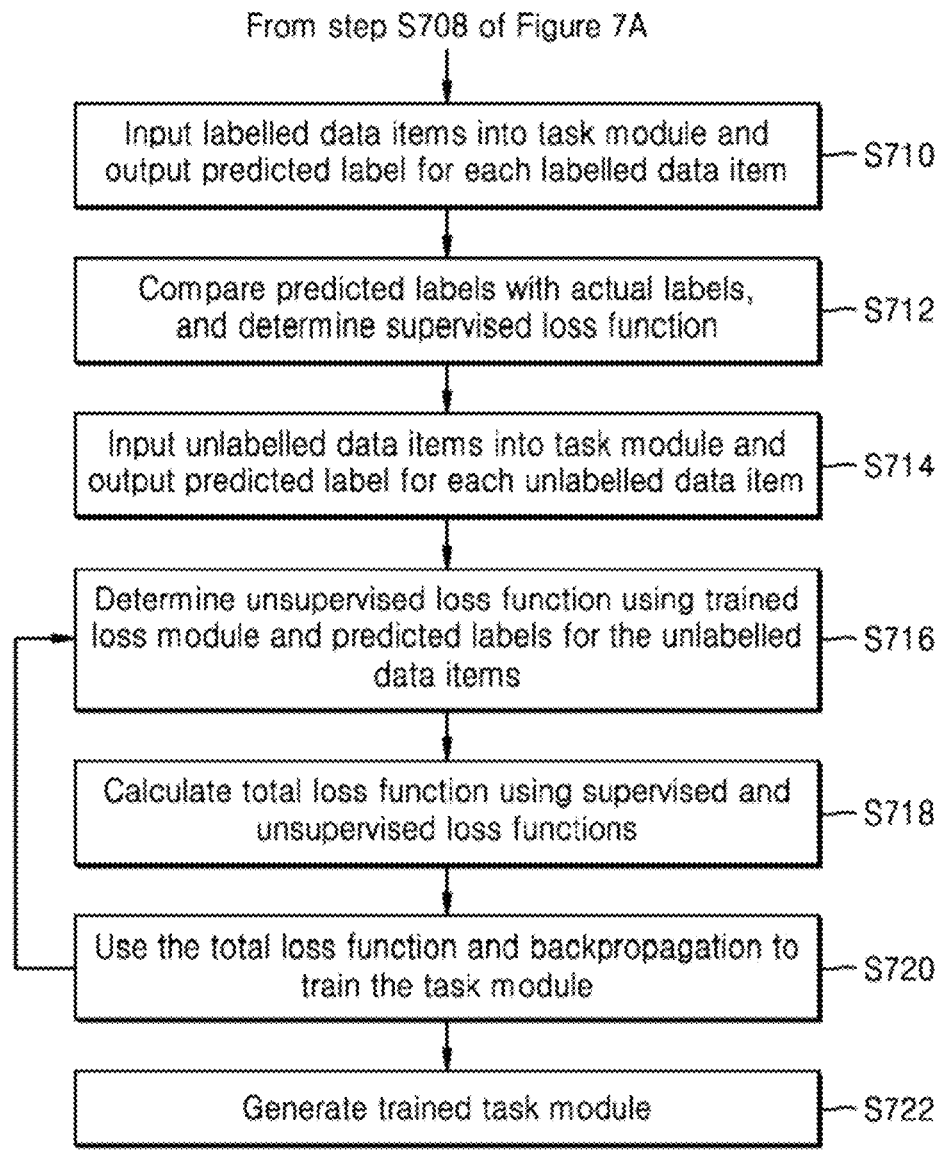

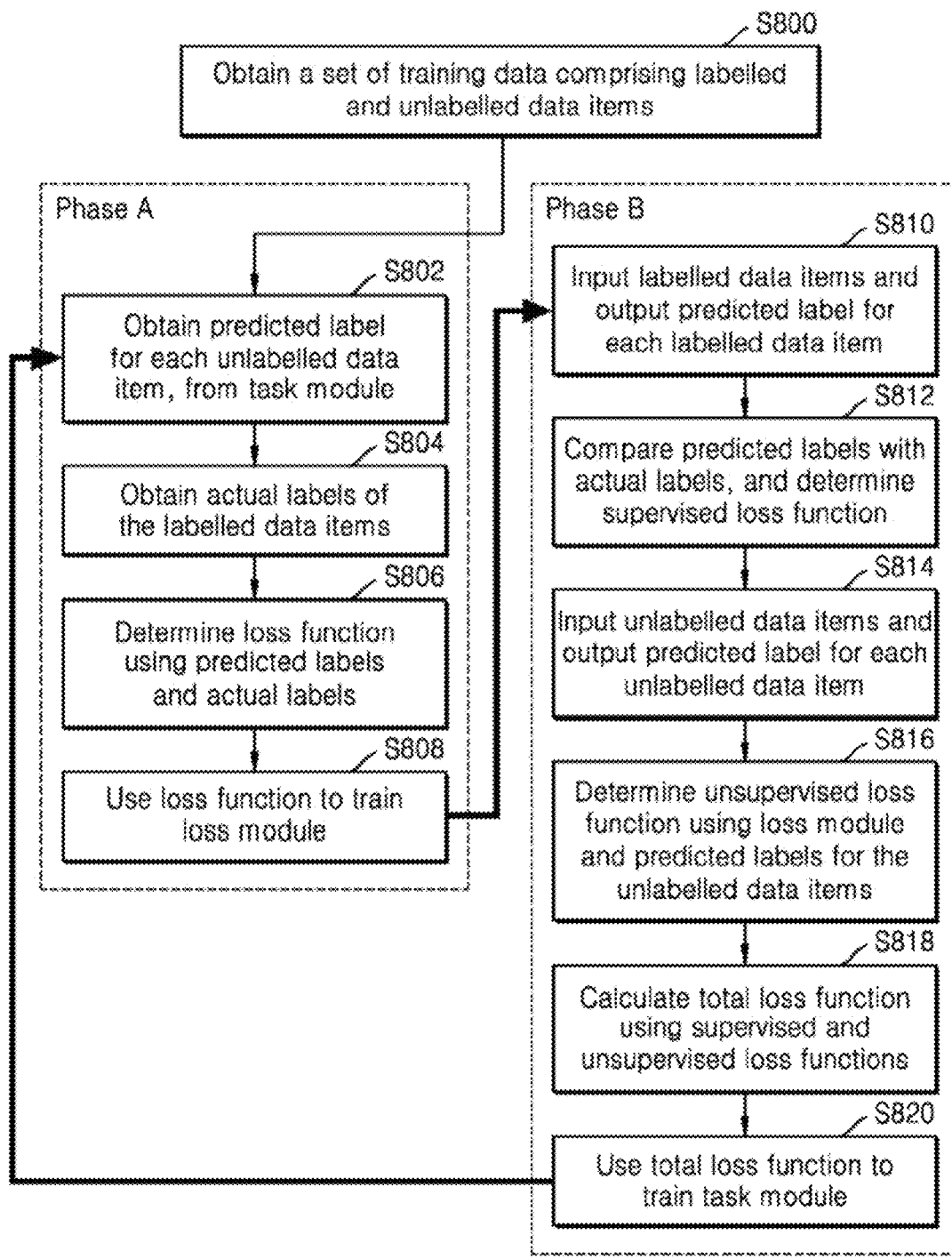

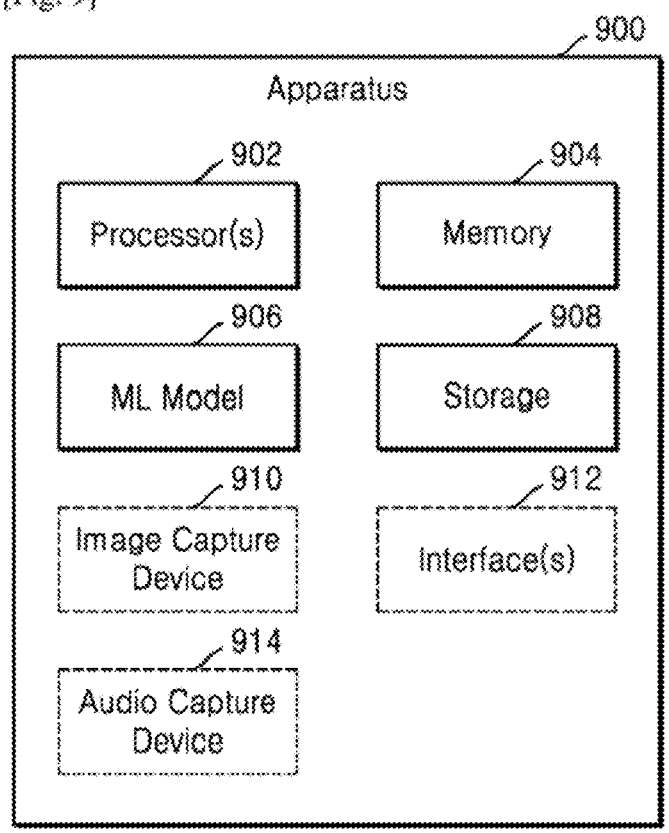

METHOD AND APPARATUS FOR SEMI-SUPERVISED LEARNING

TECHNICAL FIELD

The present disclosure generally relates to a method and apparatus for training a machine learning, ML, model using semi-supervised learning, and in particular to a computer-implemented method for training an ML model using a combination of labelled and unlabelled data.

BACKGROUND ART

Deep neural networks (DNNs) are data intensive to train, requiring inputs (e.g. images) and supervision in the form of output labels. Data is often easy to collect, but annotating that data may cause a bottleneck, particularly in cases where annotation is not a simple categorical label but a structure (such as a label vector) or another image (as in semantic segmentation). This data annotation bottleneck makes it infeasible to implement many artificial intelligence, AI, systems, such as image segmentation systems.

Data annotation is often very laborious and time-consuming when it is performed on an end user device, such as a smartphone. However, it may be desirable to implement data annotation and AI models on such end user devices because the AI models may be used to perform on-device learning based on user data. Collecting the user data is straightforward (e.g. the user may capture images or videos using the device), but annotating the user data may be difficult.

DISCLOSURE OF INVENTION

Solution to Problem

Provided is a computer-implemented method for training a machine learning (ML) model using labelled and unlabelled data, the method comprising obtaining a set of training data comprising a set of labelled data items and a set of unlabelled data items, training a loss module of the ML model using labels in the set of labelled data items, to generate a trained loss module capable of estimating a likelihood of a label for a data item, and training a task module of the ML model using the loss module, the set of labelled data items, and the set of unlabelled data items, to generate a trained task module capable of making a prediction of a label for input data.

BRIEF DESCRIPTION OF DRAWINGS

Implementations of the present techniques will now be described, by way of example only, with reference to the accompanying drawings, in which:

FIG. 1 is a schematic diagram of a general technique for training a machine learning, ML, model using both labelled and unlabelled data according to an embodiment;

FIG. 2 is a schematic diagram showing a first technique for training an ML model using both labelled and unlabelled data according to an embodiment;

FIG. 3 is a schematic diagram showing details of the first technique for training an ML model using both labelled and unlabelled data according to an embodiment;

FIG. 4 is a schematic diagram showing details of a second technique for training an ML model using both labelled and unlabelled data according to an embodiment;

FIGS. 5A to 5C show example uses of a trained ML model that has been trained using the first or second technique;

FIG. 6 shows a flowchart of example steps to train an ML model using the general technique according to an embodiment;

FIGS. 7A and 7B show, respectively, a flowchart of steps to train a loss module and a task module of an ML model using the first technique according to an embodiment;

FIG. 8 shows a flowchart of steps to train an ML model using the second technique according to an embodiment; and FIG. 9 shows a block diagram of an apparatus used to train an ML model according to an embodiment.

BEST MODE FOR CARRYING OUT THE INVENTION

In a first approach of the present techniques, there is provided a computer-implemented method for training a machine learning (ML) model using labelled and unlabelled data, the method comprising: obtaining a set of training data comprising a set of labelled data items and a set of unlabelled data items; training a loss module of the ML model using labels in the set of labelled data items, to generate a trained loss module capable of estimating a likelihood of a label for a data item; and training a task module of the ML model using the loss module, the set of labelled data items, and the set of unlabelled data items, to generate a trained task module capable of making a prediction of a label for input data.

In a second approach of the present techniques, there is provided an apparatus for training a machine learning (ML) model using labelled and unlabelled data, the apparatus comprising: at least one memory; and at least one processor coupled to the at least one memory and configured to: obtain a set of training data comprising a set of labelled data items and a set of unlabelled data items; train a loss module of the ML model using labels in the set of labelled data items, to generate a trained loss module capable of estimating a likelihood of a label for a data item; and train a task module of the ML model using the loss module, the set of labelled data items, and the set of unlabelled data items, to generate a trained task module capable of making a prediction of a label for input data.

The features described below apply equally to the first approach and second approach.

In other words, the present techniques use semi-supervised learning techniques to address the above-mentioned problems, by leveraging cheap unlabelled data (e.g. raw images captured by a user) to train the ML model. Unlabelled data is abundant and easy to obtain, and by using a large amount of unlabelled data in combination with a small amount of labelled data, the ML model can be trained more efficiently than if all the training data was labelled data. The ML model may result in high accuracy predictions while reducing the amount of training data, and in particular, while reducing the amount of labelled training data. This advantageously enables an ML model to be trained on-device (e.g. on a user's smartphone), based on data collected by the user (e.g. images captured by the smartphone), without requiring the user to label all their data first.

Thus, the present techniques provide an ML model comprising two main modules/components: a loss module that is trained with a generative criterion to model the distribution of labels in the set of labelled data items, and a task module that is trained based on the set of labelled data items (small pool) and a set of unlabelled data items (large pool).

As explained in more detail below, the task module may be trained using a sum of a conventional supervised learning loss, and an unsupervised learning loss generated by the loss module. The unsupervised learning loss for each input into the task module is defined by the likelihood assigned by the loss module to the task module's prediction for each input.

The loss module of the ML model may comprise a generative neural network or a normalising flow neural network. The loss module may comprise a flow-based neural network. The task module of the ML model may comprise a convolutional neural network (CNN).

Generally speaking, the loss module may be implemented using any type of loss module and therefore, the loss function may be any type of loss function. In one example, the loss module may be a generative loss module (such as that implemented by a variational autoencoder, VAE, or a generative adversarial network, GAN). The loss function may be a generative neural network. The loss module may be implemented by normalising flows (i.e. likelihood models implemented using invertible neural networks). The loss module may therefore be referred to as a flow module. In this example, the loss function may be a negative log likelihood. In each case, the training is used to maximise the data likelihood, or minimise the loss function.

The training of the machine learning model, i.e. training the loss module and task module, may be performed in two ways.

One technique for training the loss module and training the task module may comprise training the loss module to generate a trained loss module, and using the trained loss module to train the task module.

In this case, the loss module is used to define a loss function for each label in the set of labelled data items. Backpropagation is used to train the loss module in order to minimise this loss function. Thus, the training of the loss module may comprise: determining a loss function representing a likelihood of a label in the set of labelled data items; and using the determined loss function and backpropagation to train the loss module to minimise the loss function.

In this case, once the loss module has been trained, the task module can be trained. The training of the task module may comprise evaluating the task module's predictions by using a supervised loss module to compare predicted labels to true/real labels for each labelled data item, and by using the trained loss module to evaluate the task module's predicted labels for each unlabelled data item. Thus, the training of the task module may comprise: inputting a data item in the set of labelled data items into the task module and outputting a predicted label for the data item in the set of labelled data items; comparing, using a supervised loss module, the output predicted label for the data item in the set of labelled data items with an actual label of the data item in the set of labelled data items, and determining a supervised loss function; inputting a data item in the set of unlabelled data items into the task module and outputting a predicted label for the data item in the set of unlabelled data items; determining an unsupervised loss function using the trained loss module and the output predicted label for the data item in the set of unlabelled data items; calculating a total loss function based on the supervised loss function and the unsupervised loss function; and using the total loss function and backpropagation to train the task module.

Another technique for training the loss module and training the task module may comprise alternating between a step to train the loss module and a step to train the task module for a fixed number of iterations or until convergence. That is, the loss module is trained jointly with the task module, and the two training steps are performed in an alternating and iterative manner.

In this case, during each iteration the step to train the loss module may comprise: obtaining, from the task module, a predicted label for a data item in the set of unlabelled data items; obtaining an actual label for a data item in the set of labelled data items; determining, using the predicted label and the actual label, a loss function; and using the loss function and backpropagation to train the loss module to minimise the loss function. (It is noted that minimising the loss function is equivalent to maximising a likelihood in the case that the loss function is defined as a negative likelihood.)

As noted above, the loss function may be a generative loss function or a likelihood, which may be implemented by a normalising flow.

During each iteration, after the step to train the loss module has been performed, the step to train the task module may be performed. The training of the task module may comprise evaluating the task module's predictions by using the supervised loss module to compare predicted labels to true/real labels for each labelled data item, and by using the trained loss module to evaluate the task module's predicted labels for each unlabelled data item. Thus, the training of the task module may comprise: inputting a data item in the set of labelled data items into the task module and outputting a predicted label for the data item in the set of labelled data items; comparing, using a supervised loss module, the output predicted label for the data item in the set of labelled data items with an actual label of the data item in the set of labelled data items, and determining a supervised loss function; inputting a data item in the set of unlabelled data items into the task module and outputting a predicted label for the data item in the set of unlabelled data items; determining an unsupervised loss function using the loss module and the output predicted label for the data item in the set of unlabelled data items; calculating a total loss function based on the supervised loss function and the unsupervised loss function; and using the total loss function and backpropagation to train the task module.

The apparatus may be any one of: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, a smart consumer device, a server, a remote server or a cloud server. It will be understood that this is a non-exhaustive and non-limiting list of example apparatus.

The apparatus may comprise an image capture device for capturing images and videos. The apparatus may comprise an audio capture device for capturing/recording sounds such as speech. Thus, the apparatus may be used by a user to take photographs or make sound recordings, for example. The apparatus may further comprise storage for storing data items (such as photos, videos, audio files, etc.) obtained by a user using the apparatus. These user-captured data items may be used to train the ML model. These user-captured data items will likely be unlabelled, and therefore, may form or be part of the set of unlabelled data items that is used to train the ML model. In other words, the set of unlabelled data items may be entirely formed of or may comprise the user-captured data items in the storage. When such user-captured data items are used for training the ML model, the trained ML model may be personalised for the user. That is, the trained ML model may be better at performing image segmentation or speech recognition tasks on data that the user captures/records in the future, because it has been trained on the user's own data.

The first and second approaches of the present techniques provide a method and apparatus for training an ML model. In a third approach of the present techniques, there is provided a computer-implemented method for performing image analysis using a trained machine learning, ML, model of the type described herein, the method comprising: receiving an image to be processed by the ML model; processing the received image using a trained task module of the ML model; and predicting, using the trained task module, an output for the received image. That is, the third approach provides a method for using the ML model once it has been trained. The method may be implemented on an apparatus, such as a smartphone. The image to be processed may be captured by a user of the apparatus. As explained above, if the ML model has been trained using user data, the trained ML model may be more accurate at performing the image analysis task on the image.

In some cases, the trained task module may be trained to perform semantic image segmentation. Thus, the prediction of the label for the input data may comprise a prediction of a semantic image segmentation for an image in the input data.

In some cases, the trained task module may be trained to analyse images of food. Thus, prediction of the label for the input data may comprise a prediction of at least one food-based descriptor for a food image in the input data (e.g. a recipe corresponding to the image, one or more ingredients identified in the image, a flavour description of the image, such as "savoury", "dessert", "sweet", etc.).

In some cases, the trained task module may be trained to perform gesture analysis or pose estimation. Thus, prediction of the label for the input data may comprise a prediction of at least one gesture or pose shown in an image in the input data.

In a related approach of the present techniques, there is provided a non-transitory computer-readable recording medium having recorded thereon processor control code to implement the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electro-magnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog (RTM) or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

The method described above may be wholly or partly performed on an apparatus, i.e. an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, the present techniques may be implemented using an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Mode for the Invention

Broadly speaking, the present techniques provide a computer-implemented method for training a machine learning, ML, model using a combination of labelled and unlabelled data and semi-supervised learning. Advantageously, the present techniques leverage large amounts of unlabelled data to train the ML model, which is more abundant and easier to obtain than labelled data. Advantageously, this may enable the ML model to be trained on consumer electronic devices such as smartphones, on unlabelled user data collected by the user using their electronic device.

FIG. 1 is a schematic diagram of a general technique 100 for training a machine learning, ML, model according to an embodiment. The ML model is trained using a set of training data comprising a set of unlabelled data items 102a and a set of labelled data items 102b. The set of labelled data items 102b may include labels for data items. The set of unlabelled data items 102a and set of labelled data items 102b are fed into a semi-supervised training process 104, which produces a trained task module 106. Once trained, the trained task module 106 may be used to analyse new inputs 110 and provide predictions 108 based on the inputs 110. Thus, generally speaking, the technique 100 uses labelled and unlabelled data items together to produce a trained task module 106, which can then make output predictions 108 based on new input data 110. The semi-supervised training process 104 will now be described in more detail.

Generally speaking, the semi-supervised training process 104 is a computer-implemented method that comprises: obtaining a set of training data comprising a set of labelled data items 102b and a set of unlabelled data items 102a; training a loss module of the ML model using labels in the set of labelled data items, to generate a trained loss module capable of estimating the likelihood of labels for data items; and training a task module of the ML model using the loss module, the set of labelled data items, and the set of unlabelled data items, to generate a trained task module capable of making a prediction of labels for input data.

The semi-supervised training process 104, i.e. training the loss module and task module, may be performed in two ways. A first technique is described with respect to FIGS. 2 and 3, and a second technique is described with respect to FIG. 4.

There is no assumption or requirements on the form of the training data, or on the form of the output data, or on the likelihood. The only requirement is that the labelled and unlabelled data items should share the same or similar distribution. That is, the training works best when the labelled and unlabelled data items share the same or similar distribution. For example, if the ML model is being trained to perform semantic segmentation on images of streets (e.g. for use by an autonomous vehicle), the labelled and unlabelled data items should ideally be images of similar looking streets.

In the case where the number of labelled data items is small, the training method described with respect to FIG. 4 may be advantageous and may help to overcome the issue.

In conventional supervised learning, a task model inputs an image and makes a prediction. It is trained using a loss like cross-entropy that compares the task network's prediction with the true label. This loss is then used by backpropagation to train the task module so that it makes a prediction that matches the true label. However, when using unlabelled data in semi-supervised learning, the task module can input an image and make a prediction, but there is now no true label to compare prediction to. To counteract this, the present techniques may use the negative log likelihood estimated by the flow to define a loss. Backpropagation then uses this loss to train the task module so that it makes predictions on the unlabelled data that have high probability according to the flow.

For example, if the ML model is being used to analyse food images and output a recipe prediction, the flow scores if the output prediction seems like a reasonable recipe. In another example, if the ML model is being used to analyse English words/sentences and output a Korean translation of the words/sentences, the flow scores if the output prediction (Korean sentence) makes sense according to the Korean language.

FIG. 2 is a schematic diagram showing a first technique for training an ML model according to an embodiment. Broadly speaking, the first technique for training the loss module and training the task module may comprise training the loss module 200 using the labelled data items 102b to generate a trained loss module 202, and using the trained loss module 202 to train the task module 204. The process results in a trained task module 106. Thus, in this technique, the loss module is trained first on the labelled data 102b and subsequently used to define a loss that helps to train the task module on the unlabelled data 102a. The loss module may be trained on the labels in the set of labelled data items 102b.

Generally speaking, the loss module may be implemented using any type of loss module and therefore, the loss function may be any type of loss function. In one example, the loss module may be a generative loss module (such as that implemented by a variational autoencoder, VAE, or a generative adversarial network, GAN). The loss function may be a generative neural network. The loss module may be implemented by normalising flows (i.e. likelihood models implemented using invertible neural networks). The loss module may therefore be referred to as a flow module. The loss function may represents the likelihood of the labels. For example, the loss function may be a negative log likelihood. In each case, a lower value of the loss function represents higher likelihood. Thus, the training is used to maximise likelihood or minimise the loss function.

Thus, in some cases, the loss module is a generative neural network module g with parameters w. A flow is trained on a dataset $D=\{y_1, \ldots, y_N\}$, such as a collection of images. (The term y is referred to herein as 'image' for brevity, but it can represent other things such as attribute vectors or category labels. Furthermore, existing flow modules are trained on task inputs (x), whereas the flow modules of the present techniques are trained on task outputs (y)).

A key attribute of a flow neural network is that it can run in two directions. In the forward direction, a normal random variable z can be input, and an image $y=g_w(z)$ can be output. In the backward direction, an image y can be input, and a Gaussian random variable $z=g_w^{-1}(y)$ can be output. After training, the flow has two capabilities. Firstly, it can input a new datum y (e.g. an image), and estimate its likelihood (i.e. $p_y(y; w)$), where the condition on w means "as estimated by flow $g_w$". This is not achievable by a traditional GAN. Secondly, it can also sample a new image from the flow which should follow the same distribution as the training data, i.e. $y^* \sim g_w$. The first capability is key to the present techniques.

In general terms, the flow neural network is trained to maximise the likelihood of the labels in the set of labelled data items. This is analogous to fitting a Gaussian distribution to a set of observations, but the flow is able to deal with much more complex data. Once the flow is trained, it is used to estimate the likelihood of labels for predicted by the task model for the set of unlabelled data items.

In an embodiment, in order to evaluate the probability of a datum (image) y given a trained flow $g_w$, given the change of variables formula, the flow is run backward to obtain a Gaussian random variable z. Then the probability of $p_z(z)$ is evaluated and corrected by the Jacobean:

$$z=g_w^{-1}(y), p_y(y;w)=p_z(z;w)|det J_{g_w^{-1}}(y;w)| \quad (Eq\ 1)$$

where J is the Jacobean matrix of partial derivatives, and "det" is the determinant.

In order to train the flow $f_w$ given a dataset $D=\{y_1, \ldots, y_N\}$, the flow network parameters w may be updated so that the flow maximizes the likelihood of the training dataset:

$$w^* = \underset{w}{\mathrm{argmax}} \prod_i p_y(y_i; w)$$

where $p_y(y_i; w)$ is the probability of the data $y_i$, as estimated by flow $g_w$, according to Eq (1).

The loss for flow training is may be the log likelihood of the training dataset:

$$L = \log p(D; w) = \sum_i \log p_y(y_i; w) = \sum_i \log p_z(g_w^{-1}(y_i); w) + \log|det J_{g_w^{-1}}(y_i; w)|$$

The first term, for example, means that data item $y_i$ is sent backward through the flow ($z_i = g_w^{-1}(y_i)$), and then evaluate its density under a reference distribution $p_z$ (e.g., standard normal).

To train flow, differentiate to obtain the gradient with respect to w and train by back-propagation as usual for neural networks.

$$\nabla_w L = -\frac{1}{N}\sum_{k=1}^{N} \nabla_w \log p(g_w^{-1}(y_i); w) + \nabla_w \log|det J_{g_w^{-1}}(y_i; w)|$$

The loss for flow training may be the Kullback-Leibler divergence (KLD) between data $p^*_y(y)$ and flow distributions $p_y(y_i; w)$: $p_y(y; w)$: $L=KLD(p^*_y(y)\|p_y(y; w))$.

For semi-supervised learning, there is a set of labelled data items and a set of unlabelled data items:

$D^L=\{(x_1, y_1), \ldots, (x_N, y_N)\}$, $D^U=\{x_1, \ldots, x_M\}$.

For inputs x and outputs y. The task module f should predict $y=f_v(x)$.

The labels $(y_1, \ldots, y_N)$ are used to train the flow, as described above.

For semi-supervised learning two loss modules are required—a supervised loss module and an unsupervised loss module:

$L^S(y_i, f_v(x_i))$: A conventional supervised loss that scores the model's prediction $f_v(x_i)$ against the true label $y_i$, when using the labelled data $(x_i, y_i) \in D^L$. Typically, this is cross-entropy, or mean square error.

$L^U(f_v(x_i))$: An unsupervised loss module that scores the model's prediction when using the unlabelled data $x_i \in D^U$ without ground-truth to compare against.

The key differing factor in semi-supervised learning methods is how to define $L^U$. In the present techniques, the unlabelled data loss may be defined as the negative log likelihood of the predicted label $\hat{y}=f_v(x_i)$, as estimated by the flow. IE: $L(\hat{y})=-\log p_y(\hat{y}; w)$, calculated according to Eq 1. The task module $f_v(x)$ is then trained in a semi-supervised way, by minimizing the sum of the losses with gradient descent and back-propagation:

$$v^* = \underset{v}{\mathrm{argmin}} \sum_i L^S(y_i, f_v(x_i)) + \sum_j L^U(f_V(x_j)).$$

Since the flow is differentiable, it is possible to compute $\bar{\nabla}_v L^U(f_v(x_j))$ in order to achieve this.

FIG. 3 is a schematic diagram showing details of the first technique for training an ML model according to an embodiment. Firstly, the loss module 300 of the ML model is trained using the set of labelled data items. The loss module 300 of the ML model may be trained using labels in the set of labelled data items 102b. The loss module is used to evaluate a loss function for each label in the set of labelled data items. Back-propagation is used to train the loss module in order to minimise this loss function. Thus, the training of the loss module 300 may comprise: determining a loss function 302 for each label in the set of labelled data items; and using the determined loss function 302 and backpropagation 304 to train the loss module to minimise the loss function. This process is performed until the loss module 300 has been sufficiently trained. The result of the training process is a trained loss module 202. The loss function 302 for each label in the set of labelled data items 102b represents the likelihood of each label in the set of labelled data items 102b.

Once the trained loss module 202 has been obtained, the task module 306 of the ML module can be trained. The training of the task module may comprise evaluating the task module's predictions by using a supervised loss module to compare predicted labels to true/real labels for each labelled data item. The training of the task module 306 may comprise: inputting data items in the set of labelled data items 102b into the task module 306 and outputting a predicted label for each data item in the set of labelled data items 102b; comparing, using a supervised loss module 308, each of the output predicted labels for the labelled data items with the actual label of the corresponding labelled data item, and determining a supervised loss function 310; inputting data items in the set of unlabelled data items 102a into the task module 306 and outputting a predicted label for each data item in the set of unlabelled data items 102a; determining an unsupervised loss function 312 using the trained loss module 202 and the output predicted labels for the unlabelled data items; calculating a total loss function 314 based on the supervised loss function 310 and the unsupervised loss function 312; and using the total loss function 314 and backpropagation 316 to train the task module 306. The calculating of the total loss function 314 based on the supervised loss function 310 and the unsupervised loss function 312 may comprise summing the supervised loss function 310 and the unsupervised loss function 312. This process is performed until the task module 306 has been sufficiently trained. The result of the training process is a trained task module 106.

An advantage of the first technique for training an ML model is that it could be used for personalization, to improve the performance of a specific user's device over time. For example, when the model is running on a user's device (such as a smartphone) the set of labelled data items 102b may be pre-provided, while the set of unlabelled data items 102a is user-collected data such as photos, videos, or speech or audio recordings captured/recorded with or otherwise obtained by the user device. In this case the user's own data is unannotated so cannot be used to train a conventional task module for image segmentation or speech recognition. However, using the labelled system provided data 102b and unlabelled user data 102a together with the first training technique, the task module can be re-trained or fine-tuned with both datasets. In this way, the task module becomes personalized to the user's data distribution and increases its accuracy at, for example, image segmentation or speech recognition tasks performed on the user's specific data distribution.

As explained below, the training process may also advantageously enable the user's own data to be labelled. This could be helpful in the future as it may enable a user to more quickly search and find specific data items within their own user-captured data (e.g. to find pictures of the user smiling or pictures of the user's dog).

A potential limitation of the training technique shown in FIGS. 2 and 3 is that if the set of labelled data items 102b is very small, the loss module 300 may not have enough data to be trained with. In the case where the set of labelled data items 102b is very small, the loss module 300 may be trained at the same time as training the task module 306, by using the predictions of the task module 306 as training data for the loss module 300.

Thus, the second technique for training the loss module and training the task module may comprise alternating between a step to train the loss module and a step to train the task module for a fixed number of iterations or until convergence. That is, the loss module is trained jointly with the task module, and the two training steps are performed in an alternating and iterative manner.

FIG. 4 is a schematic diagram showing details of the second technique for training an ML model according to an embodiment. In this case, during each iteration the step to train a loss module 300 may comprise: obtaining, from the task module 306, a predicted label for each data item in the set of unlabelled data items 102a; obtaining an actual label for each data item in the set of labelled data items 102b; determining, using the predicted label and the actual label, a loss function 302; and using the loss function 302 and backpropagation 304 to train the loss module 302. Thus, during each iteration, the loss module 300 is trained using the predictions made by the task module 306 (which is assumed to be 'fixed'), and predictions made by the loss module 300 itself.

During each iteration, after the step to train a loss module 300 has been performed, the step to train a task module 306 may be performed. The training of the task module may comprise evaluating the task module's predictions by using a supervised loss module to compare predicted labels to true/real labels for each labelled data item. Thus, the training of the task module may comprise: inputting data items in the set of labelled data items 102b into the task module 306 and outputting a predicted label for each data item in the set of labelled data items 102b; comparing, using a supervised loss module 308, each of the output predicted labels for the labelled data items with the actual label of the corresponding labelled data item, and determining a supervised loss function 310; inputting data items in the set of unlabelled data items 102a into the task module 306 and outputting a predicted label for each data item in the set of unlabelled data items 102a; determining an unsupervised loss function 312 using the loss module 300 (i.e. the state of the loss module 300 resulting from the above-mentioned step to train the loss module 300 in this iteration) and the output predicted labels for the unlabelled data items; calculating a total loss function 314 based on the supervised loss function 310 and the unsupervised loss function 312; and using the total loss function 314 and backpropagation 316 to train the task module 300. The calculating of the total loss function 314 based on the supervised loss function 310 and the unsupervised loss function 312 may comprise summing the supervised loss function 310 and the unsupervised loss function 312. The state of the task module 300 during this iteration is then used in the subsequent iteration to make the predictions used to train the loss module 300.

An advantage of the second technique for training an ML model is that it could also be used for data augmentation. That is, in cases where the set of labelled data items 102b is very small, but where the set of unlabelled data items 102a is large, the second training technique may effectively enable the generation of accurate labels for the unlabelled data items. (This works best when the labelled and unlabelled data items share the same distribution. For example, if the ML model is being trained to perform semantic segmentation on images of streets (e.g. for use by an autonomous vehicle), the labelled and unlabelled data items should ideally be images of similar looking streets.) In other words, one output of the second training technique is the trained ML model, and another output is labels for the unlabelled data items 102a that were used to train the ML model. This is advantageous because it increases the amount of labelled data items available for other applications or for training other ML models.

Accordingly, the present techniques also provide a computer-implemented method data augmentation, the method comprising: training an ML model using the second training technique described herein; and outputting at least one label for each of the unlabelled data items 102a.

FIGS. 5A to 5C show example uses of a trained ML model that has been trained using the first or second technique. The trained ML model may be used for image analysis, for example. In another approach of the present techniques, there is provided a computer-implemented method for performing image analysis using a trained machine learning, ML, model of the type described herein, the method comprising: receiving an image to be processed by the ML model; processing the received image using a trained task module of the ML model; and predicting, using the trained task module 106, an output for the received image.

In some cases, the trained task module 106 may be trained to perform semantic image segmentation. Thus, input data may comprise images and the predicting of the output may comprise predicting a semantic image segmentation for the received image, as shown in FIG. 5A. Here the predicted output is itself an image.

In some cases, the trained task module 106 may be trained to analyse images of food. Thus, input data may comprise food images and the predicting of the output may comprise predicting at least one food-based descriptor for the received image, as shown in FIG. 5B. Here, the predicted output is a list of food-based descriptors, e.g. text description of what the image shows and/or what the image represents. For example, the descriptor may be a recipe corresponding to the image, one or more ingredients identified in the image, a flavour description of the image, such as "savoury", "dessert", "sweet", and so on.

In some cases, the trained task module may be trained to perform gesture analysis or pose estimation. Thus, input data may comprise images and the predicting of the output may comprise predicting at least one gesture or pose shown in the received image, as shown in FIG. 5C.

FIG. 6 shows a flowchart of example steps to train an ML model (using labelled and unlabelled data) according to an embodiment using the general technique described above with respect to FIG. 1. The method comprises: obtaining a set of training data comprising a set of labelled data items and a set of unlabelled data items (step S100); training a loss module of the ML model using the set of labelled data items, to generate a trained loss module capable of estimating the likelihood of labels for data items (step S102); and training a task module of the ML model using the loss module, the set of labelled data items, and the set of unlabelled data items, to generate a trained task module capable of making a prediction for input data (step S104). Step S102 may be performed before step S104, as explained above with reference to FIGS. 2 and 3 (and the flowcharts shown in FIGS. 7A and 7B), or step S102 may be performed together with step S104, as explained with reference to FIG. 4 (and the flowchart shown in FIG. 8).

FIGS. 7A and 7B show, respectively, a flowchart of steps to train a loss module and a task module of an ML model using the first technique (i.e. the technique described above with respect to FIGS. 2 and 3) according to an embodiment. As explained above, the first technique involves first training the loss module of the ML model to generate a trained loss module, and then using the trained loss module to train the task module of the ML model to generate a trained task module. FIG. 7A shows steps to train the loss module. Once these steps have been performed, the process moves to the steps shown in FIG. 7B to train the task module.

As shown in FIG. 7A, the first technique for training an ML model begins by obtaining a set of training data comprising a set of labelled data items and a set of unlabelled data items (step S700). The technique then comprises training the loss module 300 of the ML model using the set of labelled data items. Labels in the set of labelled data items are input into the loss module 300 (step S702). The loss module 300 is used to evaluate a loss function for each label in the set of labelled data items. Thus, the loss module determines a loss function 302 for each label in the set of labelled data items (step S704). The loss function 302 is used to train the loss module. Specifically, back-propagation is used to train the loss module in order to minimise this loss function. Thus, the process involves using the determined loss function 302 and back-propagation 304 to train the loss module 300 to minimise the loss function 302 (step S706). As shown by the loop in the flowchart, steps S704 and S706 are performed repeatedly until the loss module 300 has been sufficiently trained. The result of the training process is the generation of a trained loss module 202 (step S708).

Once the trained loss module 202 has been obtained, the task module 306 of the ML module can be trained, and so the process moves to the steps shown in FIG. 7B. The training of the task module may comprise evaluating the task module's predictions by using a supervised loss module to compare predicted labels to true/real labels for each labelled data item, and by using the trained loss module to evaluate the task module's predicted labels for each unlabelled data item. As shown in FIG. 7B, the training of the task module 306 may comprise: inputting the set of labelled data items 102b into the task module 306 and outputting a predicted label for each labelled data item (step S710). The output predicted labels for each labelled data item are compared with actual labels of each labelled data item using a supervised loss module 308, and the comparison is used to determine a supervised loss function (step S712). Next, the set of unlabelled data items 102a are input into the task module 306, and a predicted label for each unlabelled data item is output (step S714). The output predicted labels for each unlabelled data item and the trained loss module 202 are used to determine an unsupervised loss function 312 (step S716). Thus, this is how the training of the loss module is used to help train the task module. A total loss function 314 is calculated by summing the supervised loss function and the unsupervised loss function (step S718). The total loss function 314 and backpropagation 316 is used to train the task module 306 (step S720). As shown by the loop in the flowchart, steps S716 to S720 are performed until the task module 306 has been sufficiently trained. The result of the training process is the generation of a trained task module 106 (step S722).

FIG. 8 shows a flowchart of steps to train an ML model using the second technique (i.e. the technique described above with respect to FIG. 4) according to an embodiment. As shown in FIG. 8, the loss module and task module are trained together. Steps to train the loss module may be performed first (phase A), and then steps to train the task module may be performed (phase B). The loss module that results at the end of each iteration of phase A training is used in the subsequent iteration of phase B training, and the task module that results at the end of each iteration of phase B training is used in the subsequent iteration of phase A training. Phase A and phase B may be repeated until both modules are sufficiently trained.

As shown in FIG. 8, the second technique for training an ML model begins by obtaining a set of training data comprising a set of labelled data items and a set of unlabelled data items (step S800). The technique then comprises training the loss module 300 of the ML model using the set of labelled data items.

During each iteration, the steps to train the loss module 300 (phase A) may comprise: obtaining, from the task module 306, a predicted label for each unlabelled data item of the set of unlabelled data items 102a (step S802); obtaining actual labels for each labelled data item in the set of labelled data items 102b (step S804); determining, using the predicted labels and the actual labels, a loss function 302 (step S806); and using the loss function 302 and backpropagation 304 to train the loss module 302 (step S808). Thus, during each iteration of phase A, the loss module 300 is trained using the predictions made by the task module 306 (which is assumed to be 'fixed'), and predictions made by the loss module 300 itself.

During each iteration, after the steps to train the loss module 300 have been performed, the steps to train the task module 306 (phase B) may be performed. The training of the task module may comprise evaluating the task module's predictions by using a supervised loss module to compare predicted labels to true/real labels for each labelled data item, and by using the trained loss module to evaluate the task module's predicted labels for each unlabelled data item. Thus, the training of the task module may comprise: inputting the set of labelled data items 102b into the task module 306 and outputting a predicted label for each labelled data item (step S810); comparing, using a supervised loss module 308, the output predicted labels for each labelled data item with actual labels of each labelled data item, and determining a supervised loss function (step S812); inputting the set of unlabelled data items 102a into the task module 306 and outputting a predicted label for each unlabelled data item (step S814); determining an unsupervised loss function 312 using the loss module 300 (i.e. the state of the loss module 300 resulting from the above-mentioned steps to train the loss module 300 in this iteration) and the output predicted labels for each unlabelled data item (step S816); calculating a total loss function 314 by summing the supervised loss function 310 and the unsupervised loss function 312 (step S818); and using the total loss function 314 and backpropagation 316 to train the task module 300 (step S820). The state of the task module 300 during this iteration is then used in the subsequent iteration to make the predictions used to train the loss module 300, as shown by the arrow connecting step S820 and step S802.

The training of the second technique may comprise alternating between the steps to train the loss module and the steps to train the task module for a fixed number of iterations or until convergence. That is, the loss module is trained jointly with the task module, and the two training steps are performed in an alternating and iterative manner.

FIG. 9 shows a block diagram of an apparatus 900 used to train an ML model 906 according to an embodiment. The apparatus 900 may be any one of: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, a smart consumer device, a server, a remote server or a cloud server. It will be understood that this is a non-exhaustive and non-limiting list of example apparatus. It will be understood that the training of the ML model could be performed on the same device (e.g. a smartphone) which is used to obtain the labelled and unlabelled data items, or could be performed on a different device (e.g. a server).

The apparatus 900 comprises at least one processor 902 coupled to at least one memory 904. The at least one processor 902 may comprise one or more of: a microprocessor, a microcontroller, and an integrated circuit. The memory 904 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

The at least one processor 902 may be configured to: obtain a set of training data comprising a set of labelled data items and a set of unlabelled data items. The set of training data may be stored in storage 908. In some cases, the apparatus 900 may comprise, for example, an image capture device 910 for capturing images and/or videos that may form the set of unlabelled data items. The apparatus 900 may comprise, for example, an audio capture device 914 for capturing sounds such as speech, that may form the set of unlabelled data items. Thus, the apparatus 900 may be used by a user to capture data items, and these user-captured data items may be stored in storage 908. As explained above, using the user's own data items to train the ML model 906, the trained ML model 906 may be personalised to the user. The apparatus 900 may comprise one or more interfaces 912 for receiving data (e.g. from other devices connected/connectable to the apparatus 900) that may form the set of unlabelled data items.

The at least one processor 902 may be configured to: train a loss module of the ML model 906 using labels in the set of labelled data items, to generate a trained loss module capable of estimating the likelihood of labels for data items; and train a task module of the ML model 906 using the loss module, the set of labelled data items, and the set of unlabelled data items, to generate a trained task module capable of making a prediction of labels for input data.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. A computer-implemented method for training a machine learning (ML) model using labelled and unlabelled data, the method comprising:
   obtaining a set of training data comprising a set of labelled data items and a set of unlabelled data items;
   training a loss module of the ML model using labels in the set of labelled data items, to generate a trained loss module capable of estimating a likelihood of a label for a data item; and
   training a task module of the ML model using the loss module, the set of labelled data items, and the set of unlabelled data items, to generate a trained task module capable of making a prediction of a label for input data, wherein the training of the task module comprises:

inputting a data item in the set of labelled data items into the task module and outputting, from the task module, a predicted label for the data item in the set of labelled data items;

comparing, using a supervised loss module, the output predicted label for the data item in the set of labelled data items with an actual label of the data item in the set of labelled data items, and determining a supervised loss function based on a result of the comparing;

inputting a data item in the set of unlabelled data items into the task module and outputting, from the task module, a predicted label for the data item in the set of unlabelled data items;

determining an unsupervised loss function using the trained loss module and the output predicted label, output from the task module, for the data item in the set of unlabelled data items, wherein the unsupervised loss function is defined by a likelihood of the predicted label for the data item in the set of unlabelled data items;

calculating a total loss function based on a sum of the supervised loss function and the unsupervised loss function; and using the total loss function and backpropagation to train the task module by minimizing the sum of the supervised loss function and the unsupervised loss function.

2. The method as claimed in claim 1, wherein the loss module of the ML model comprises a generative neural network or a normalising flow neural network.

3. The method as claimed in claim 1, wherein the training of the loss module comprises:

determining a loss function representing a likelihood of a label in the set of labelled data items; and using the determined loss function and backpropagation to minimize the loss function.

4. A computer-implemented method for training a machine learning (ML) model using labelled and unlabelled data, the method comprising:

obtaining a set of training data comprising a set of labelled data items and a set of unlabelled data items;

training a loss module of the ML model using labels in the set of labelled data items, to generate a trained loss module capable of estimating a likelihood of a label for a data item, wherein the task module outputs a predicted label for a data item in the set of unlabelled data items, and the loss module is trained further using the predicted label for the data item in the set of unlabelled data items;

training a task module of the ML model using the trained loss module, the set of labelled data items, and the set of unlabelled data items, to generate a trained task module capable of making a prediction of a label for input data, wherein the task module outputs both the predicted label for the data item in the set of unlabelled data items and a predicted label for a data item in the set of labelled data items; and wherein the training of the loss module and the training of the task module comprises alternating between a step to train the loss module and a step to train the task module for a fixed number of iterations or until convergence.

5. The method as claimed in claim 4, wherein the step to train the loss module comprises:

obtaining, from the task module, the predicted label for the data item in the set of unlabelled data items;

obtaining an actual label for a data item in the set of labelled data items;

determining, using the predicted label and the actual label, a loss function; and using the loss function and backpropagation to train the loss module to minimise the loss function.

6. The method as claimed in claim 4, wherein the step to train the task module comprises:

inputting the data item in the set of labelled data items into the task module and obtaining the predicted label for the data item in the set of labelled data items;

comparing, using a supervised loss module, the output predicted label for the data item in the set of labelled data items with an actual label of the data item in the set of labelled data items, and determining a supervised loss function;

inputting a data item in the set of unlabelled data items into the task module and obtaining the predicted label for the data item in the set of unlabelled data items;

determining an unsupervised loss function using the loss module and the output predicted label for the data item in the set of unlabelled data items;

calculating a total loss function based on the supervised loss function and the unsupervised loss function; and using the total loss function and backpropagation to train the task module.

7. The method as claimed in claim 1, wherein the trained task module is trained to perform a semantic image segmentation and wherein the prediction of the label for the input data comprises a prediction of a semantic image segmentation for an image in the input data.

8. The method as claimed in claim 1, wherein the trained task module is trained to analyse images of food, and wherein the prediction of the label for the input data comprises a prediction of at least one food-based descriptor for a food image in the input data.

9. The method as claimed in claim 1, wherein the trained task module is trained to perform gesture analysis or pose estimation, and wherein the prediction of the label for the input data comprises a prediction of at least one gesture or pose shown in an image in the input data.

10. A non-transitory computer-readable recording medium having recorded thereon code which, when implemented on a processor, causes the processor to carry out the method of claim 1.

11. An apparatus for training a machine learning (ML) model using labelled and unlabelled data, the apparatus comprising:

at least one memory; and at least one processor coupled to the at least one memory and configured to:

obtain a set of training data comprising a set of labelled data items and a set of unlabelled data items, train a loss module of the ML model using labels in the set of labelled data items, to generate a trained loss module capable of estimating a likelihood of a label for a data item, and train a task module of the ML model using the loss module, the set of labelled data items, and the set of unlabelled data items, to generate a trained task module capable of making a prediction of a label for input data, wherein the at least one processor is configured to train the task module by:

inputting a data item in the set of labelled data items into the task module and outputting, from the task module, a predicted label for the data item in the set of labelled data items;

comparing, using a supervised loss module, the output predicted label for the data item in the set of labelled data items with an actual label of the data item in the set of labelled data items, and determining a supervised loss function based on a result of the comparing;

inputting a data item in the set of unlabelled data items into the task module and outputting, from the task module, a predicted label for the data item in the set of unlabelled data items;

determining an unsupervised loss function using the trained loss module and the output predicted label, output from the task module, for the data item in the set of unlabelled data items, wherein the unsupervised loss function is defined by a likelihood of the predicted label for the data item in the set of unlabelled data items;

calculating a total loss function based on a sum of the supervised loss function and the unsupervised loss function; and using the total loss function and backpropagation to train the task module by minimizing the sum of the supervised loss function and the unsupervised loss function.

12. The apparatus as claimed in claim 11 further comprising storage configured to store data items obtained by a user of the apparatus, and wherein the set of unlabelled data items comprises the data items in the storage.

13. The apparatus as claimed in claim 12, wherein the loss module of the ML model comprises a normalising flow neural network.

14. The apparatus as claimed in claim 12, wherein the at least one processor is configured to train the loss module by:

determining a loss function representing a likelihood of a label in the set of labelled data items; and using the determined loss function and backpropagation to minimise the loss function.

* * * * *